United States Patent [19]
Henderson et al.

[11] 3,993,328
[45] Nov. 23, 1976

[54] VEHICLE DOOR MOUNTED CONTINUOUS LOOP SYSTEM

[75] Inventors: Cyril Henderson, Woodland Hills; Akira Tanaka, Northridge, both of Calif.

[73] Assignee: American Safety Equipment Corporation, Encino, Calif.

[22] Filed: Aug. 11, 1975

[21] Appl. No.: 603,520

[52] U.S. Cl. .............................. 280/747; 297/388; 297/389
[51] Int. Cl.² ........................................ B60R 21/10
[58] Field of Search ............. 280/150 SB, 744, 747, 280/745; 180/82 C; 297/388, 389; 242/107.4

[56] References Cited
UNITED STATES PATENTS

| | | | |
|---|---|---|---|
| 3,727,943 | 4/1973 | Augunas et al. | 280/150 SB |
| 3,764,161 | 10/1973 | Bright et al. | 280/150 SB |
| 3,771,814 | 11/1973 | Hahn | 280/150 SB |
| 3,865,397 | 2/1974 | Pilhall et al. | 280/150 SB |
| 3,888,541 | 6/1975 | Stephenson | 280/150 SB X |

*Primary Examiner*—Robert R. Song
*Assistant Examiner*—Michael J. Forman
*Attorney, Agent, or Firm*—Poms, Smith, Lande & Glenny

[57] ABSTRACT

A single continuous loop safety belt harness assembly for a vehicle has a retractor which is attached to a first end of a safety belt harness for retractably storing and adjustably anchoring the safety belt, and which is mounted in a rearward position upon the vehicle door. A belt guide is provided for receiving the belt extending upward from the retractor, and for directing the belt in a downward direction diagonally across the torso of the occupant seated in the vehicle. A second end of the belt is attached to a lower portion of the door by means of an anchor. A releasable connector is mounted upon the belt between the belt guide and the anchor, for connecting a central portion of the belt to a floor-mounted buckling member on the opposite side of the occupant's seat from the door, thereby forming a safety harness assembly wherein a portion of the belt is directed diagonally downward across the torso of the occupant from the belt guide on the door and a second portion of the belt is directed horizontally across the pelvic region of the occupant from the anchor. The entire safety belt harness assembly is mounted upon the vehicle door such that, when the assembly is not in use, the entire belt is retracted to a position adjacent the door and is swung completely out of the way of the occupant upon the opening of the door, thereby allowing unimpeded entrance to and egress from the vehicle.

10 Claims, 11 Drawing Figures

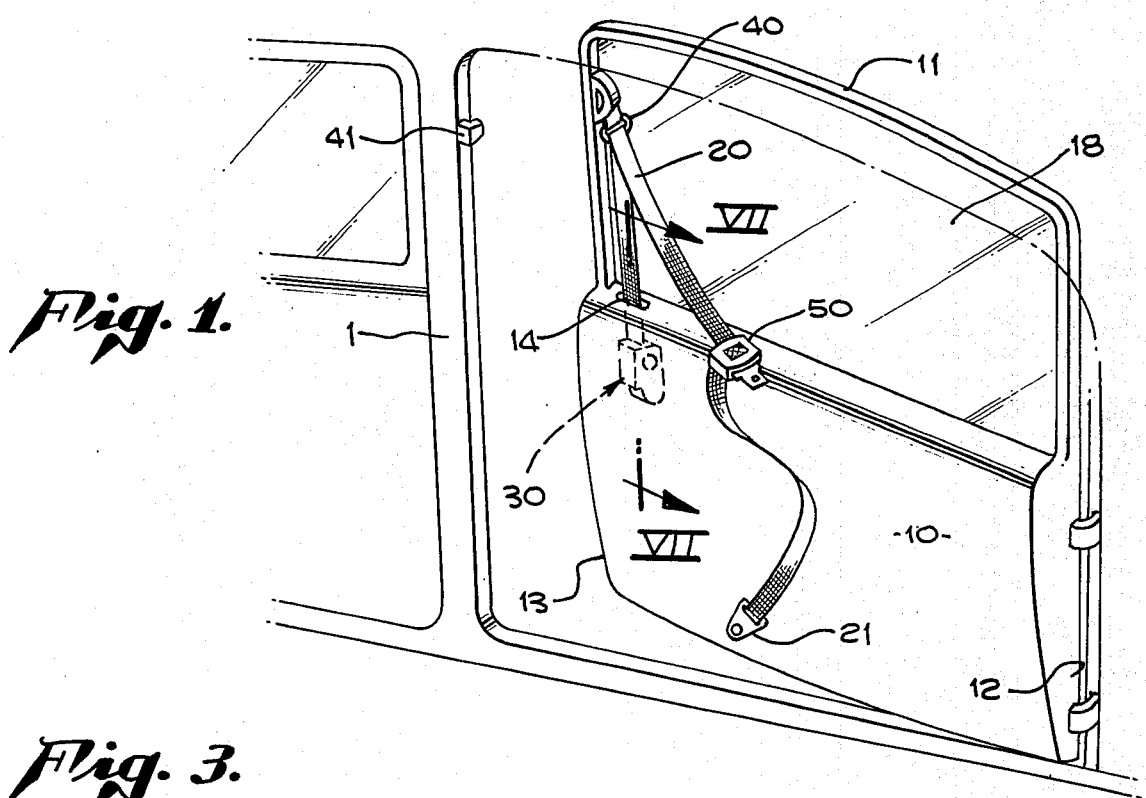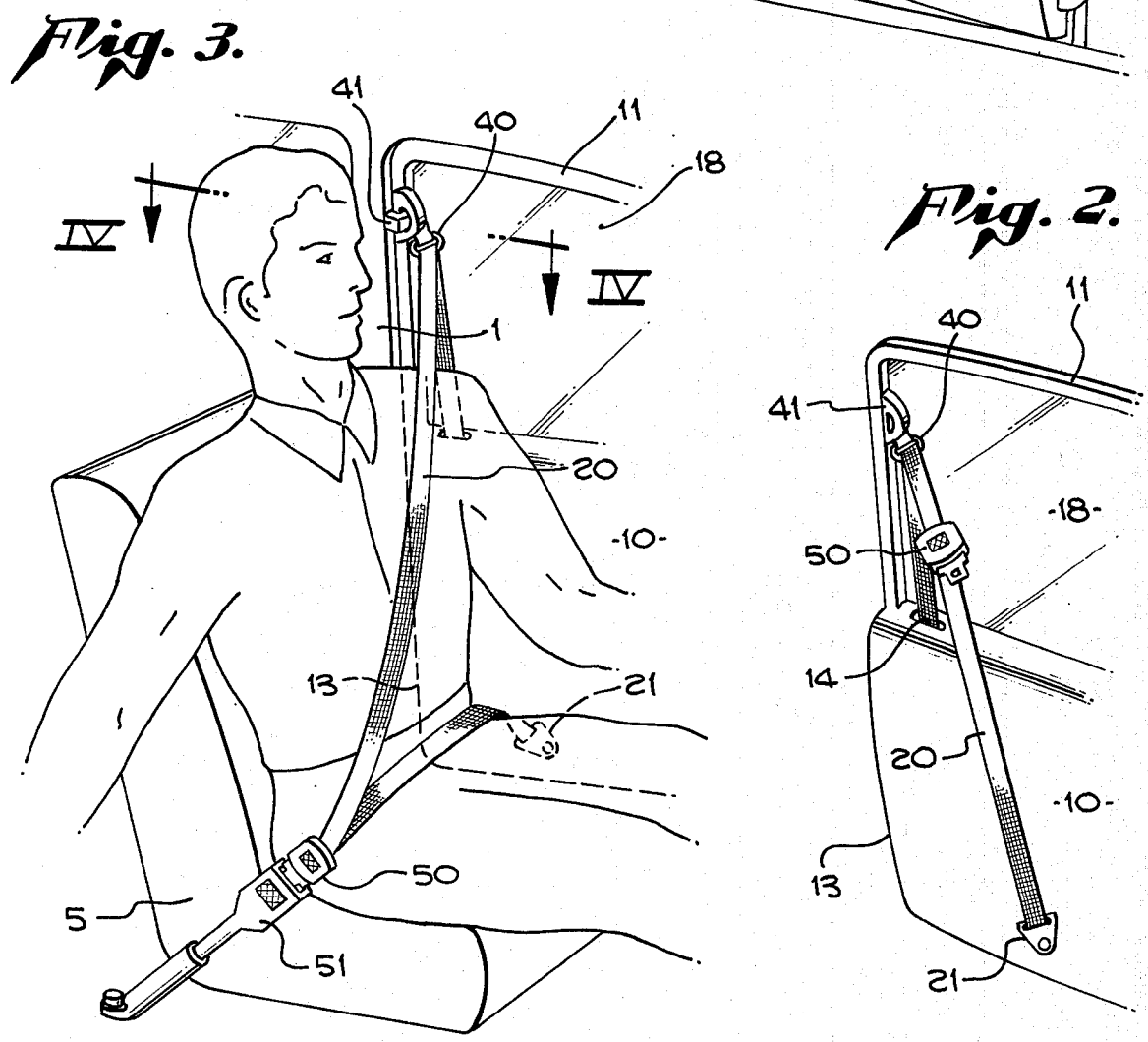

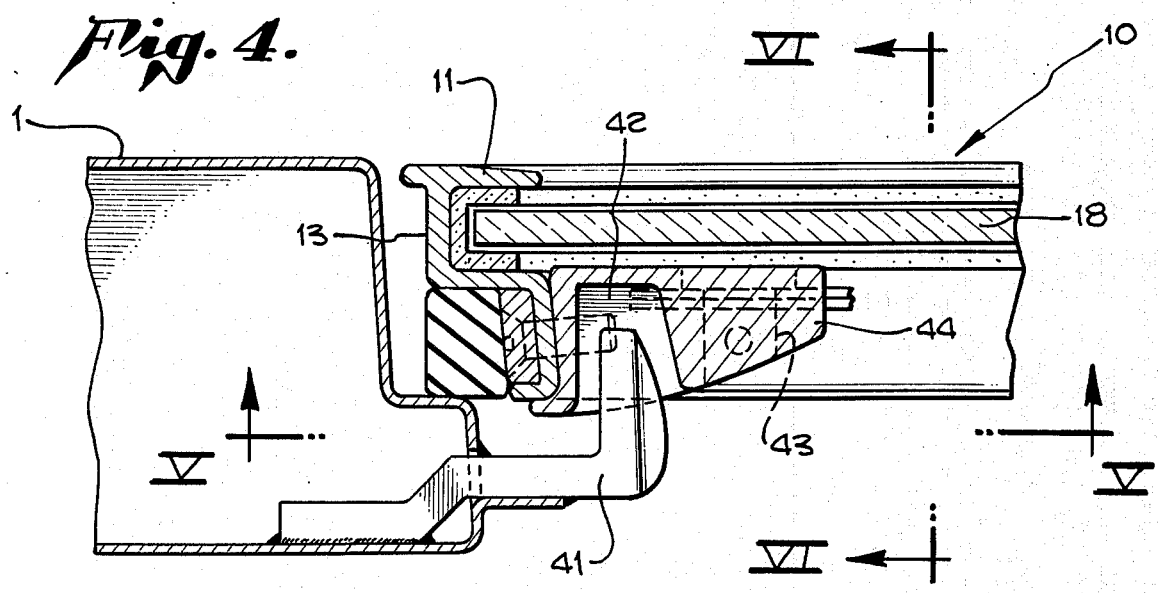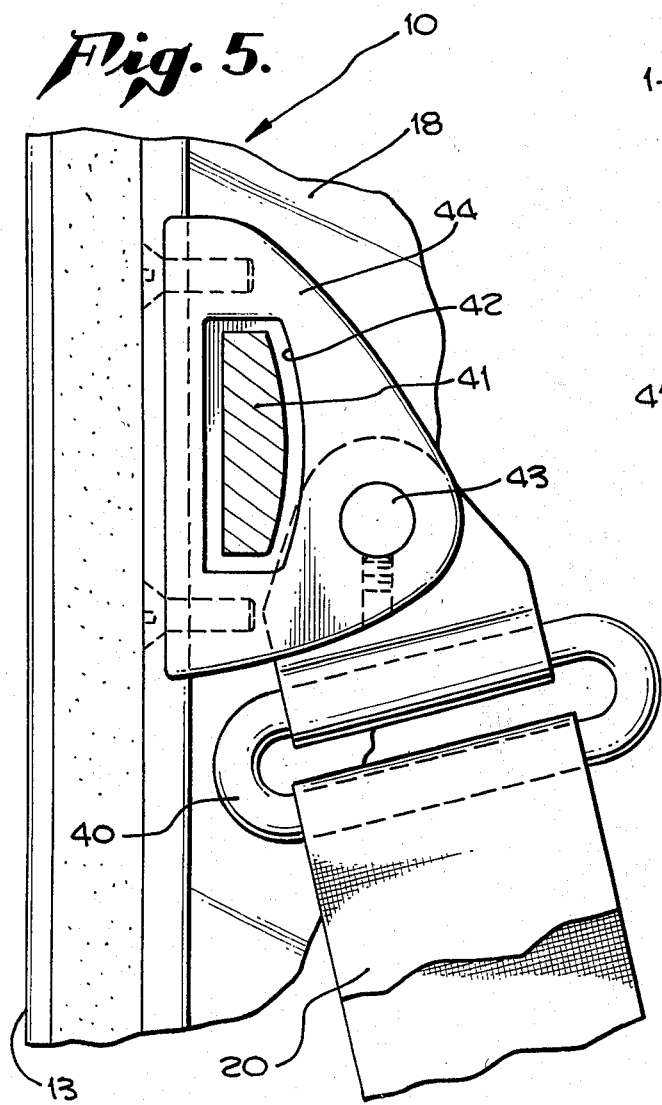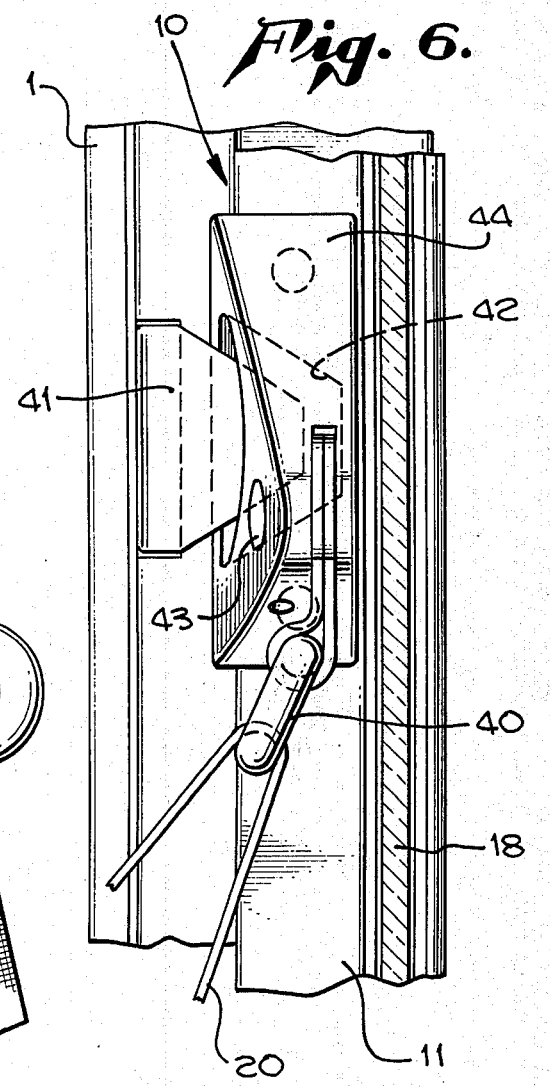

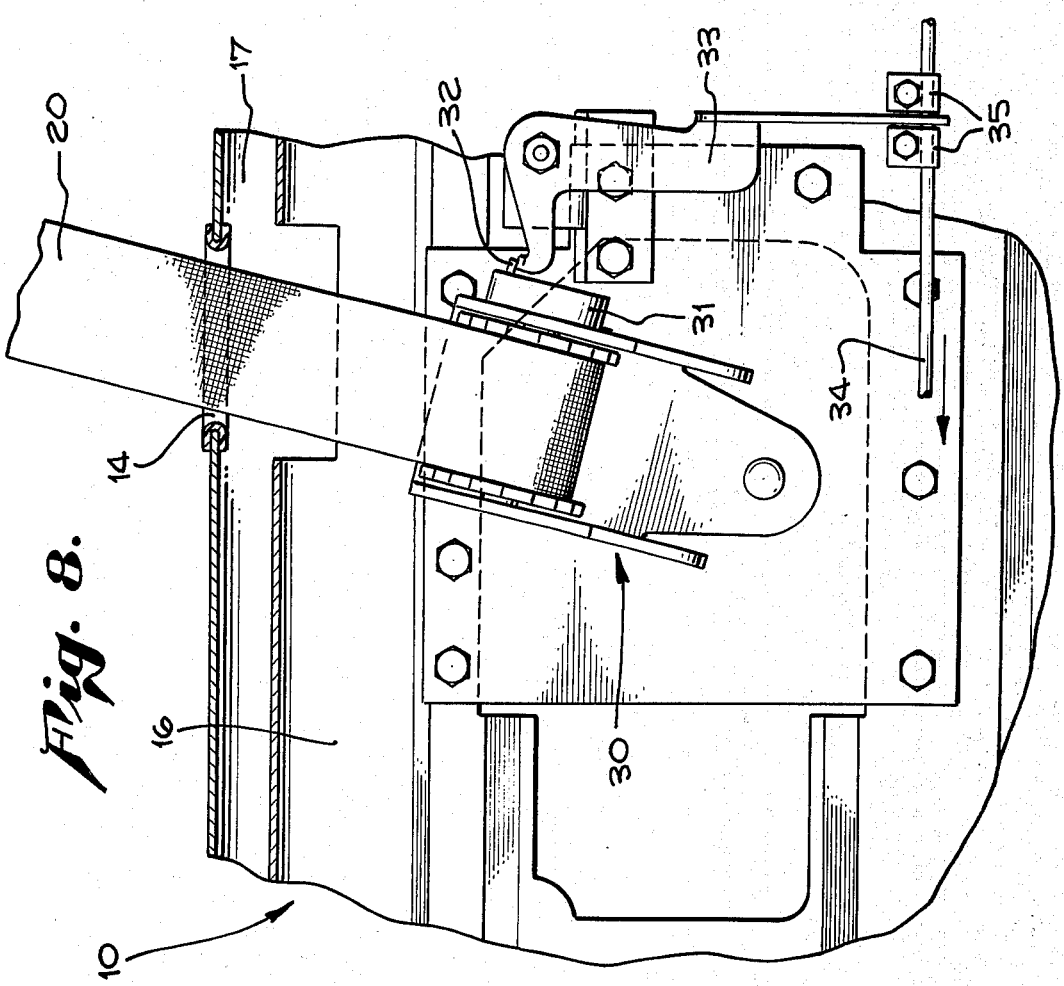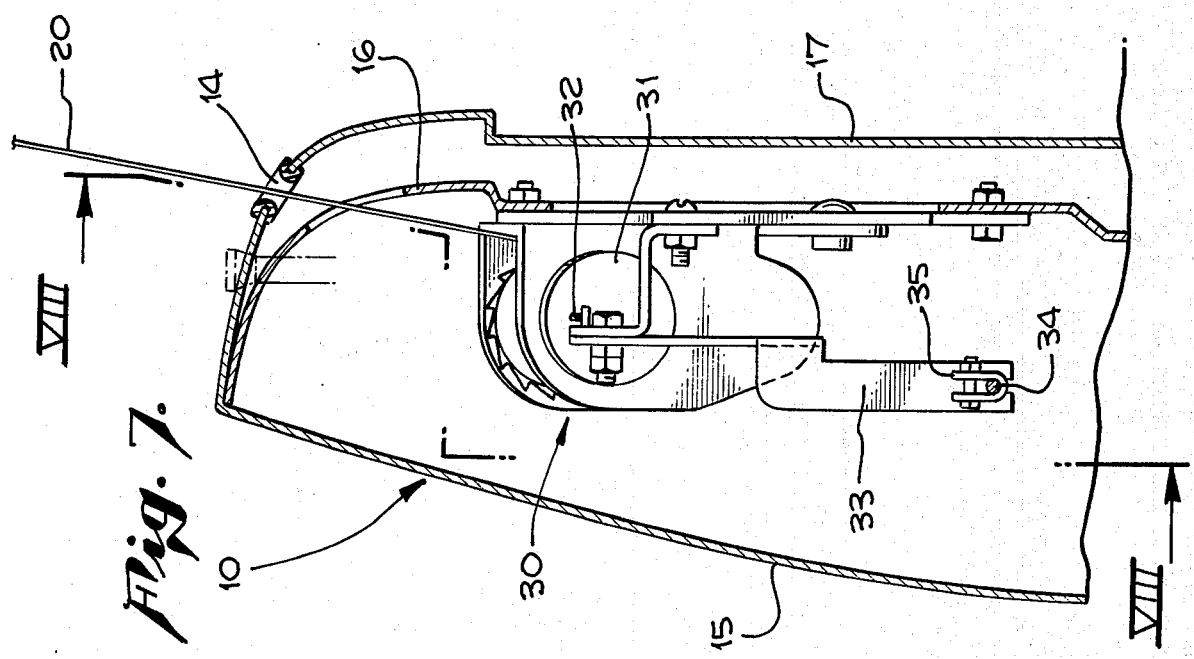

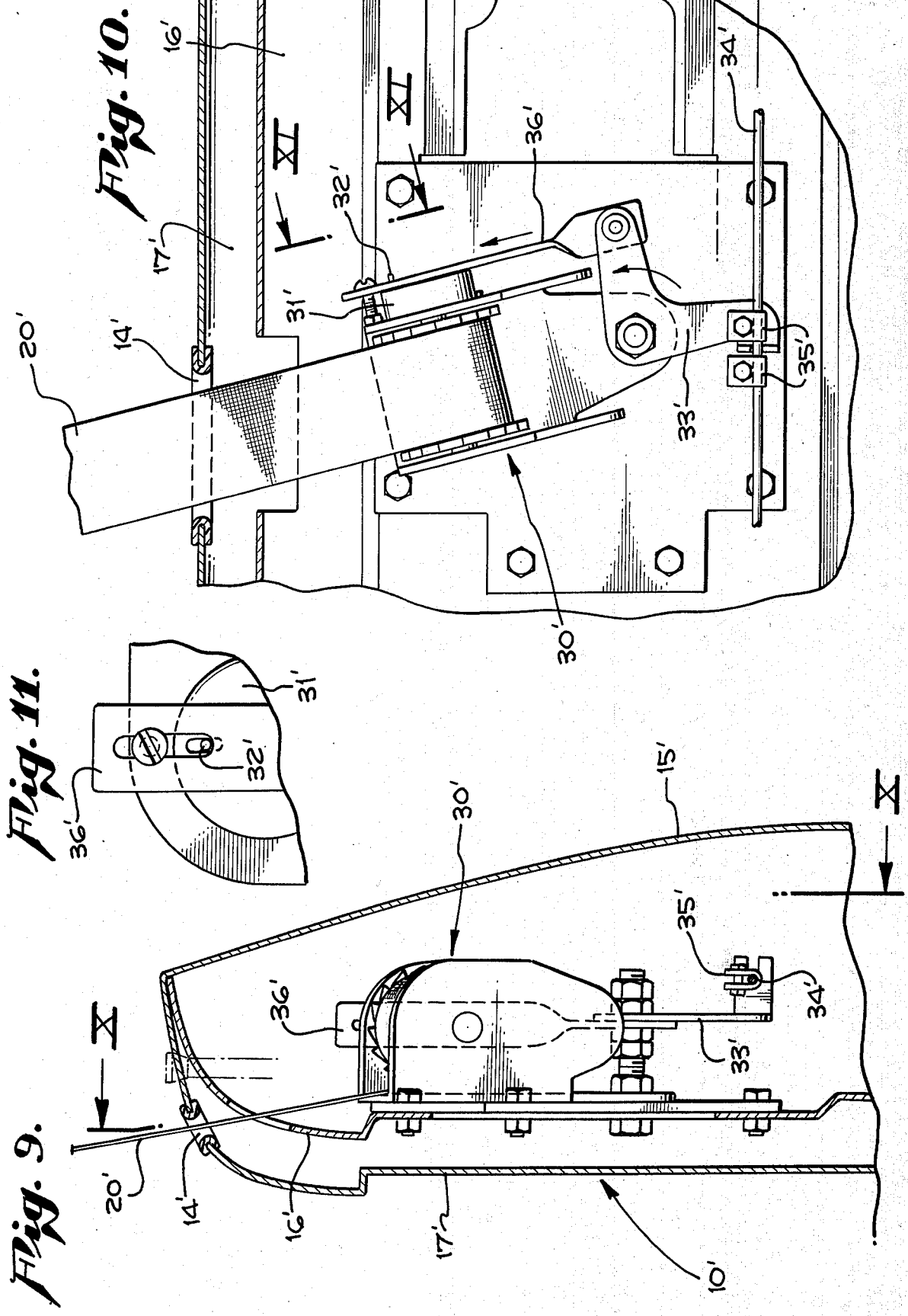

VEHICLE DOOR MOUNTED CONTINUOUS LOOP SYSTEM

BACKGROUND OF THE INVENTION

The present invention relates in general to safety belt harness asemblies employed to safely restrain an occupant within a vehicle seat during emergency conditions encountered by the vehicle. More particularly, the present invention relates to a continuous single loop safety belt harness assembly which is easily utilized by the occupant of the vehicle and which is mounted and stored entirely within and upon the vehicle door when not in use.

Various approaches to the problem of convenience and secure passenger restraint have utilized a safety belt system mounted partially upon the vehicle door. These systems, in general, have involved the use of roof and/or door mounted multiple retraction mechanisms, slidable carriers or pulleys and electrical motors. These approaches to the problem have been complicated, sophisticated and expensive to manufacture, install and maintain. Additionally, in the aforementioned systems, the safety belt webbing remains within the passenger compartment of the vehicle as an impediment to unobstructed entrance and egress. Examples of these systems are found in the prior U.S. Pat. Nos. 3,679,229 (Weststrate), 3,770,078 (Keppel) and 3,777,840 (Botnick).

A counter-approach to the problem of expense and complexity has been the so-called "continuous loop system" or "three-point system," wherein a single floor or roof mounted retractor anchors one end of a safety belt, the second end of which is attached to either the roof or floor opposite the retractor. A central portion of the belt is then connected in some manner to the floor of the vehicle, such that the belt is drawn across the occupant forming a pelvic/torso safety harness. Examples of these approaches are found in prior U.S. Pat. Nos. 3,258,293 (Sharp) and 3,606,455 (Carter) as well as U.S. patent application Ser. No. 580,766 (Henderson and Close).

In these prior continuous single loop systems the belt has remained stretched across the various portions of the passenger compartment of the vehicle or has been hung across door openings normally used for entrance or egress by the occupants, and has thus constituted an obstacle which is hazardous or, at the very least, annoying to the occupants upon entrance or egress.

BRIEF DESCRIPTION OF THE INVENTION

Therefore, it is the primary object of the present invention to provide and disclose an improved safety belt harness assembly for use in restraining occupants within a vehicle seat which will utilize a minimum of mechanical components, require minimal activity on the part of the occupant to utilize the assembly and which will, when not in use, be stored in such a manner that the passenger compartment and the entrance thereto and egress therefrom are uncluttered and unimpeded.

Generally stated, the single continuous loop safety belt harness assembly of the present invention includes the provision of a continuous safety belt, anchored at a first end by a retractor mounted in an upper rearward position of the vehicle door, which passes upward through a belt guide mounted upon a rear portion of the door frame and then downward to a fixed anchor mounted upon a lower portion of the door. A releasable connector is attached to a central portion of the belt between the belt guide and the anchor, such that when the belt is withdrawn from the retractor and the releasable connector is drawn across the body of the occupant and fastened to a floor-mounted buckling member on the side of the occupant's seat opposite the door, the safety belt forms a generally "V-shaped" configuration across the pelvic region and torso of the occupant.

When the occupant wishes to disconnect the harness assembly and exit the vehicle, the buckling member is disconnected and the entire length of safety belt is drawn into a position adjacent the door where it is swung out entirely away from the occupant when the door is opened, thus permitting unimpeded egress.

Further objects and advantages of the single continuous loop safety harness assembly of the present invention, as well as a better understanding thereof, will be afforded to those skilled in the art from a consideration of the following detailed explanation of a preferred exemplary embodiment thereof. Reference will be made to the appended sheets of drawings which will now be first described briefly.

BRIEF DESCRIPTION OF THE DRAWINGS

FIG. 1 is a perspective view showing the vehicle door slightly open and the single continuous loop safety belt harness assembly of the present invention partially extended from a retractor mounted within the interior portion of the vehicle door.

FIG. 2 is a perspective view showing the single continuous loop safety belt harness assembly of the present invention retracted into a position adjacent the vehicle door.

FIG. 3 is a perspective view showing the single continuous loop safety belt harness assembly of the present invention fully extended across an occupant and connected with a floor mounted buckling member.

FIG. 4 is a sectional view of the passive belt guide restraint means taken through the plane IV—IV of FIG. 3 showing the relative positions of the restraint means and belt guide means when the vehicle door is closed.

FIG. 5 is a side view taken through the plane V—V of FIG. 4.

FIG. 6 is an end view taken through the plane VI—VI of FIG. 4.

FIG. 7 is a sectional view of the interior portion of the left-hand vehicle door through the plane VII—VII of FIG. 1, showing the tensionless belt retractor means and the deactivator means for the tensionless feature.

FIG. 8 is a side sectional view taken through the plane VIII—VIII of FIG. 7.

FIG. 9 is a sectional view of the interior portion of the right-hand door, taken through the plane corresponding to plane VII—VII of FIG. 1, showing the tensionless belt retractor means and deactivator means for the tensionless feature.

FIG. 10 is a side sectional view taken through the plane X—X of FIG. 9.

FIG. 11 is a detailed view through the plane XI—XI of FIG. 10 showing the tensionless deactivator means interacting with the deactivator pawl.

DETAILED DESCRIPTION OF A PREFERRED EMBODIMENT

The single continuous loop safety belt harness assembly of the preferred examplary embodiment of the present invention, as shown in FIGS. 1, 2 and 3, is intended for use in a vehicle which, for purposes of illustration, is provided with a door 10 having a window frame 11, hinged at a forward edge 12 and whose rear edge 13 thus swings in an arch from a position adjacent seat 5 when the door 10 is closed (see FIG. 3) to a position away from the area of passenger movement during entrance to or egress from the vehicle by an occupant (see FIG. 1).

This normal and routine movement of door 10 upon entrance and egress is utilized in conjunction with the present invention to move the entire safety belt harness assembly out away from the vehicle passenger compartment, thus allowing an entrance or egress completely unimpeded by any elements of the safety belt harness assembly.

The single continuous loop safety belt harness assembly of the present invention is shown generally in FIG. 1 and comprises a continuous loop of safety belt webbing 20 attached at a first end to, and adjustably anchored by, a retractor 30. In the exemplary embodiment in FIG. 1, the retractor 30 is mounted in an upper rearward position within an interior portion of the vehicle door. Other mounting positions in either a lower or a more forward direction would be acceptable but would require the use of an overly long safety belt 20.

Belt guide means 40 are mounted upon the frame 11 of the vehicle door 10 in a position above the retractor means 30 for receiving the belt 20 extending from the retractor 30 and for directing the belt in a downward direction diagonally across the torso of an occupant seated in the vehicle seat 5. In the exemplary embodiment in FIGS. 5 and 6, the belt guide 40 is attached to the belt guide mounting base 44 by a belt guide pivot 43. It is readily apparent that this embodiment will eliminate any tendency for the belt 20 to bind within the belt guide 40, as the belt guide 40 is able to respond to variations in the manner in which the belt withdrawn from the retractor 30 by various occupants. In the exemplary embodiment, as shown in FIGS. 1, 2 and 3, the belt guide is mounted near the upper portion of the door frame 11 to minimize the interference between the belt 20 and the occupant's arms. A lower mounting position is possible in cases where the rear edge 13 of the closed door extends a sufficient distance behind the seat to direct the belt 20 over the occupant's shoulder and away from the arms.

Anchor means 21, attached to the belt 20 at a second end, anchor the belt 20 to a lower portion of the door 10. In the exemplary embodiment, the anchor means 21 are forward of and lower than the retractor 30, preferably adjacent the seat 5. This placement maximizes the efficacy of the assembly while allowing the use of a minimum length of belt.

Releasable connector means 50 mounted upon the belt 20 between the belt guide means 40 and the anchor means 21 releasably connect a central portion of the belt 20 to the vehicle floor-mounted buckling member 51 on the side of the vehicle seat 5 opposite the door 10, thereby forming a safety harness assembly, as shown in FIG. 3, wherein a portion of the belt 20 is directed diagonally downward across the torso of the occupant from the belt guide means 40 on the door 10 and a second portion of the belt 20 is directed horizontally across the pelvic region of the occupant from the anchor means 21 also mounted on the door 10. An exemplary embodiment of the releasable connector 50 which could be incorporated into the restraint assembly of the present invention is shown in U.S. patent application Ser. No. 508,776, filed May 27, 1975, which releasable connector is incorporated herein by reference.

The single continuous loop safety belt harness assembly of the present invention comprising safety harness belt 20, retractor means 30, belt guide means 40, releasable connector means 50, and anchor means 21 is mounted entirely upon the vehicle door 10 such that when the assembly is not in use the entire belt is retracted into a position adjacent the door, as shown in FIG. 2, and is swung completely out of the way of the occupant upon the opening of the door, thereby allowing unimpeded entrance to and egress from the vehicle by the occupant.

The improvement of the single continuous loop safety belt harness assembly of the present invention also includes the provision of belt slot means 14, shown in FIG. 1, through an inner surface 17 of the door 10 as shown in FIG. 7 for the belt 20 to pass therethrough in the exemplary wherein the retractor 30 is mounted within an interior portion of the door 10. The desirability of placing the retractor 30 within the interior portion of the door 10 lies in the resultant reduction in objects projecting into the passenger compartment, leading to increased safety during a collision and a neater appearing passenger compartment.

The single continuous loop safety belt harness assembly may also comprise tensionless means to selectively relieve tension from the retractor 30 upon the belt 20. In the exemplary embodiment, tensionless means 31 allow the occupant to eliminate the discomfort of the continuous pressure against the upper torso caused by the tension from the retractor 30 to the belt 20. An exemplary tensionless feature which could be incorporated into the single continuous loop safety belt harness assembly of the present invention is shown in Heath, U. S. Pat. No. 3,834,646 (1974), which feature is incorporated herein by reference. An alternative to the Heath retractor may be found in Kuszynski, U.S. Pat. No. 3,682,412 (1972).

The improved single continuous loop safety belt harness assembly of the present invention further comprises deactivator means, mounted upon the vehicle door, connecting the tensionless means of the retractor with the door latch. This enables the occupant to deactivate the tensionless means of the retractor upon operation of the door latch, thereby allowing the retractor to retract the belt into a storage mode prior to the occupant's exiting the vehicle. In the exemplary embodiment, as shown in FIG. 8, the tensionless means 31 is equipped with a deactivator pawl 32 which contacts an actuator lever 33 which is connected to the door latch release rod 34 and held in position by clamps 35. Upon the opening of the door 10, door latch rod 34 rotates the actuating lever 33 which moves the deactivator pawl 32, deactivating the tensionless means 31 feature of the retractor 30, thus allowing the retractor to retract and store the safety belt 20.

The single continuous loop safety belt harness assembly of the present invention further comprises passive belt guide restraint means 41 attached to the vehicle adjacent the rear edge of the vehicle door 10, and adjacent the belt guide means 40, positioned to be normally out of engagement with the belt guide means and to engage and anchor the belt guide means upon a slight deformation of the vehicle door frame upon the application of excessive force thereto by the single continuous loop safety belt harness assembly, as in a crash or sudden deceleration. In the exemplary embodiment, as shown in FIGS. 1 and 3, the passive belt guide restraint means 41 is permanently mounted upon the vehicle door pillar 1, adjacent door frame 11, such that when door 10 is closed the restraint means 41 enters aperture 42 in the belt guide mounting base 44, as is shown in FIG. 4. Restraint means 41 does not contact aperture 42 unless or until door frame 11 is slightly deformed by the forward movement of belt guide mounting base 44 as in a crash, where a high load is placed upon the single continuous loop safety belt harness assembly. This non-contact mode eliminates noise problems caused by friction or rattles between the guide base and the restraint means, and also allows the use of less critical dimensional tolerances while still maintaining the safety advantages of a fixed rigid restraint member.

We claim:

1. A single continuous loop safety belt harness assembly for a vehicle having a passenger admitting door adjacent a passenger seat within the vehicle with a floor mounted safety belt anchoring means secured to said vehicle inboard of said seat relative to said door comprising:
 a single length of safety belt and means for securing its opposite ends to said door; and
 connector means mounted to said safety belt intermediate its ends for releasable attachment to said anchoring means when said door is closed, whereby said safety belt, means for securing its opposite ends to said door and connector means are all mounted entirely upon said door for a swinging movement therewith when said connector means is not attached to said anchoring means.

2. A single continuous loop safety belt harness assembly as in claim 1 comprising:
 belt guide means mounted upon the frame of said vehicle door in a position above one end of said safety belt secured to said door for receiving said belt extending upwardly from said first anchored end and for directing said belt in a downward direction diagonally across the torso of a passenger seated in said vehicle when said connector means is secured to said anchoring means.

3. A single continuous loop safety belt harness assembly as in claim 1 comprising:
 retractor means attached to a first end of said safety belt for retractably storing and adjustably anchoring said belt and including mounting means for mounting said retractor means in a rearward position entirely upon said vehicle door, whereby said retractor means retracts said belt into a position adjacent the door when the belt is not in use and swings with movement of the door out of the way of the vehicle passenger upon the opening of said door.

4. A single continuous loop safety belt harness assembly as in claim 3 comprising:
 belt guide means mounted upon the frame of said vehicle door in a position above said retractor means for receiving said belt extending upwardly from said retractor means and for directing said belt in a downward direction diagonally across the torso of a passenger seated in said vehicle seat.

5. A single continuous loop safety belt harness assembly as in claim 1 comprising:
 means mounted entirely upon said door for retracting said safety belt and connector means into a position adjacent said door automatically when said connector means is released from said anchoring means thereby allowing unimpeded and egress from said vehicle by said passenger.

6. A single continuous loop safety belt harness assembly as in claim 5 comprising:
 tensionless means associated with said retractor means to selectively releive tension from saaid retractor means upon said belt; and
 deactivator means mounted upon said vehicle door and connected to said tensionless means for deactivating said tensionless means upon an opening movement of said door to thereby allow said retractor means to retract said belt and connector means to a position adjacent said door.

7. A single continuous loop safety belt harness assembly for a vehicle having a door with latch means, a seat and a floor-mounted buckling member, said safety harness assembly comprising:
 retractor means attached to a first end of a safety harness belt for retractably storing and adjustably anchoring said belt and including mounting means for mounting said retractor means in a rearward position upon said vehicle door;
 belt guide means mounted upon the frame of said vehicle door in a position above said retractor means for receiving said belt extending upward from said retractor means and for directing said belt in a downward direction diagonally across the torso of an occupant seated in said vehicle seat;
 anchor means attached to a second end of said belt and including mounting means for mounting said anchor means upon said vehicle door in a lower portion thereof; and
 releasable connector means mounted upon said belt between said belt guide means and said anchor means for anchoring the central portion of said belt to said vehicle floor-mounted buckling member on the side of said vehicle seat opposite said vehicle door thereby forming a safety harness assembly wherein a portion of said belt is directed diagonally downward across the torso of the occupant from the belt guide means on said door and a second portion of said belt is directed horizontally across the pelvic region of the occupant from the anchor means on said door;
 whereby said safety harness belt, retractor means, belt guide means, releasable connector means, and anchor means are mounted entirely upon said vehicle door such that when the assembly is not in use the entire belt is retracted into a position adjacent the door and is swung completely out of the way of the occupant upon the opening of said door thereby allowing unimpeded entrance and egress from said vehicle by said occupant.

8. The safety belt harness assembly of claim 7 comprising the provision of a belt slot means through an inner surface of said door for said belt to pass therethrough and said means for mounting said belt retractor means mount said retractor means within an interior portion of said door.

9. The safety belt harness assembly of claim 7 wherein said retractor means further comprises tensionless means to selectively relieve tension from said retractor upon said belt, and said assembly further comprises deactivator means mounted upon said vehicle door connecting said tensionless means of said retractor means with said door latch means to deactivate the tensionless means of the retractor means upon operation of the door latch thereby allowing the retractor means to retract the belt into a storage mode prior to the occupant's exiting the vehicle.

10. The safety belt harness assembly of claim 7 comprising passive belt guide restraint means attached to the vehicle adjacent the rear edge of said vehicle door and adjacent the belt guide means positioned to be normally out of engagement with the belt guide means and to engage and anchor said guide means upon a deformation of the vehicle door frame upon the application of excessive loading thereof by the safety belt assembly, as in a crash or sudden deceleration.

* * * * *